United States Patent [19]

Stuart et al.

[11] Patent Number: 5,498,766
[45] Date of Patent: Mar. 12, 1996

[54] TREATMENT METHOD FOR FIBROUS LIGNOCELLULOSIC BIOMASS USING FIXED STATOR DEVICE HAVING NOZZLE TOOL WITH OPPOSING COAXIAL TOOTHED RINGS TO MAKE THE BIOMASS MORE SUSCEPTIBLE TO HYDROLYSIS

[75] Inventors: Earnest D. Stuart; Vivian M. Latimer, both of Austin, Tex.

[73] Assignee: Colorado State University Research Foundation, Fort Collins, Colo.

[21] Appl. No.: 348,453

[22] Filed: Dec. 2, 1994

Related U.S. Application Data

[63] Continuation-in-part of Ser. No. 991,745, Dec. 17, 1992, Pat. No. 5,370,999.
[51] Int. Cl.$^6$ .......................... C12P 19/14; C12P 19/02; D21C 1/00
[52] U.S. Cl. ..................... 435/99; 435/105; 435/277
[58] Field of Search .................. 435/99, 105, 277

[56] References Cited

U.S. PATENT DOCUMENTS

| | | | |
|---|---|---|---|
| 1,313,403 | 8/1919 | Marsden | 435/277 |
| 2,191,977 | 2/1940 | Schneider et al. | 435/277 |
| 4,333,611 | 6/1982 | Zucker et al. | 241/1 |
| 4,409,329 | 10/1983 | Silver | 435/105 |
| 4,564,595 | 1/1986 | Neves | 435/163 |
| 4,600,590 | 7/1986 | Dale | 426/69 |
| 4,923,565 | 5/1990 | Fuentes et al. | 162/72 |
| 4,980,023 | 12/1990 | Salkinoja-Salonen | 162/135 |
| 4,997,488 | 3/1991 | Gould et al. | 127/37 |
| 5,037,663 | 8/1991 | Dale | 426/669 |
| 5,116,474 | 5/1992 | Fuentes et al. | 162/71 |
| 5,175,275 | 12/1992 | Dobashi et al. | 536/56 |

FOREIGN PATENT DOCUMENTS

| | | |
|---|---|---|
| 0202915 | 11/1986 | European Pat. Off. . |
| 2468645 | 5/1981 | France . |
| 3150750 | 6/1983 | Germany . |
| 3211346 | 9/1983 | Germany . |
| 3545746 | 6/1987 | Germany . |

OTHER PUBLICATIONS

Park et al., "Effects of Nonionic Surfactant on Enzymatic Hydrolysis of Used Newspaper," Biotechnology and Bioengineering, vol. 39:117–120 (1992).

Dale, "Cellulose Pretreatments: Technology and Techniques," Colorado State University, Annual Reports on Fermentation Processes, vol. 8, Chap. 11, p. 299 (1985).

Thompson et al., "Comparison of Pretreatment Methods on the Basis of Available Surface Area," Bioresource Technology, vol. 39:155–163 (1992).

Nystrom, "Discussion of 'Pretreatments to Enhance Enzymatic and Microbiological Attack of Cellulosic Materials,'" Biotechnol. & Bioeng. Symp., vol. 5:221–224 (1975).

Diaz, "Discussion of 'Domestic Cellulose Waste'" Biotechnol. & Bioeng. Symp., vol. 5:23–26 (1975).

Supraton® "Homogenization, Dispersion and Reaction Machines" brochure, Dorr–Oliver Deutschland GmbH (1987).

Dellweg et al., "Ethanol Fermentation: Suggestions for Process Improvements," Process Biochemistry, pp. 100–104 (Aug. 1988).

Dale et al., "A Freeze–Explosion Technique for Increasing Cellulose Hydrolysis," Biotech. & Bioeng. Symp. No. 12:31–43 (1982).

Primary Examiner—David M. Naff
Assistant Examiner—Michael V. Meller
Attorney, Agent, or Firm—Arnold, White & Durkee

[57] ABSTRACT

High-shear, microcavitation is used to shred and disintegrate fibrous lignocellulose-containing biomass to make the biomass more susceptible to hydrolysis. This process is preferably performed with the biomass particles dispersed in a slurry created using only water. The process can be performed on slurries created with other liquids such as liquid ammonia, aqueous solutions of acid or alkali reagents, or enzyme solutions containing cellulase, cellobiase or a combination thereof. High-shear microcavitation is carried out by subjecting the slurry to high-shear forces by injecting the slurry cross-currently into a turbulent Couette flow created in a high-frequency, rotor-stator device. This microcavitation shatters the fibrous structure of the biomass in the slurry thereby creating a sheared slurry. The device has a chamber containing a fixed stator equipped with a nozzle tool containing concentric rings having bore holes meshing with opposing coaxial tooth rings coupled to a rotor that is coupled to a rotatable shaft.

30 Claims, 9 Drawing Sheets

TREATMENT METHOD FOR FIBROUS LIGNOCELLULOSIC BIOMASS USING FIXED STATOR DEVICE HAVING NOZZLE TOOL WITH OPPOSING COAXIAL TOOTHED RINGS TO MAKE THE BIOMASS MORE SUSCEPTIBLE TO HYDROLYSIS

This is a continuation-in-part application of U.S. Ser. No. 07/991,745 filed Dec. 17, 1992, now U.S. Pat. No. 5,370, 999.

BACKGROUND OF THE INVENTION

1. Field of the Invention

The present invention relates to improvements in methods for treating fibrous lignocellulose-containing biomass prior to refining the biomass. The purpose of the invention is to increase the digestibility and chemical reactivity of the substrate resulting from the treatment. The invention is particularly directed to the use of high-shear forces to destroy the fibrous structure of the biomass and render the cellulose more accessible for hydrolysis.

2. Description of the Related Art

Lignocellulose-containing material can be refined to sugars, protein, and lignin. While protein and lignin extraction methods have been effective, at commercially viable enzyme loadings, sugar yields historically are well below the theoretical level. This is thought to be due to the close physical and chemical association between lignin and cellulose and hemicellulose within the cell wall of woody plants. This close association or bonding reduces the availability of the cellulose for hydrolysis. Additionally, when cellulose molecules exhibit a high degree of crystallinity in their structure they are even more resistant to hydrolysis. As a result, a great deal of effort has been directed toward overcoming these problems and thereby increasing sugar yields. Most of this effort has been directed toward finding methods for the removal of lignin and hemicellulose and the disruption and destruction of the crystalline structure of the cellulose molecule.

A key to increasing the sugar yields from lignocellulose-containing biomass is to increase access to cellulose and hemicellulose by the enzymes or other chemical or biological agents used to hydrolyze the cellulose into sugar. Thus, attempts have been made to destroy the fibrous structure of the biomass and thereby increase the reactive surface area of the resulting substrate. The greater the reactive surface area of the substrate, i.e., the treated biomass, the more access that the enzymes or other agents have to the cellulose in the substrate.

Many different techniques have been used to treat lignocellulosic biomass specifically to increase the reactive surface area of the resulting substrate. These techniques have resulted in varying degrees of effectiveness.

Concentrated acid has been used to chemically hydrolyze fibrous biomass. Biomass and the acid are combined, forming a broth. The broth is held in a vat at ambient temperature for a period of time sufficient to break down the biomass and hydrolyze the cellulose, hemicellulose, proteins and lignin. While effectively breaking down the biomass and hydrolyzing the cellulose and hemicellulose, this process creates the difficult problem of separating the sugars from the acid. Presently, there is no efficient and economical way to separate the sugars and acid, making this process undesirable for a commercial application. Furthermore, concentrated acid is corrosive and requires extreme care in handling.

Dilute acid has been used in a process to promote the disintegration of fibrous biomass. Biomass and dilute acid are combined, forming a broth. The broth is "cooked" at high temperature causing the hemicellulose to hydrolyze. The acid must then be neutralized and washed out of the mix. Following the removal of the acid, the remaining biomass is treated with high enzyme loadings, in excess of 20 IU's/gram of substrate, to hydrolyze the cellulosic fraction.

Washing the acid out of the mix creates a waste stream that must be treated prior to discharge from the processing facility. "Cooking" at high temperature causes formation of furfural and hydroxymethyl furfural in the sugar component of the mix. Furfural and hydroxymethyl furfural are toxic and inhibit fermentation, therefore they must be separated from the desirable sugars. Steps have been taken to minimize furfural production through a two-stage/two-temperature approach. First, a lower temperature hydrolyzes the $C_5$ sugars, which are removed. Then the remaining fiber is subjected to higher temperatures for decrystallization and delignification.

Separating the acids and other toxic products from the desirable sugars is difficult and expensive, limiting the usefulness of this process. The use of acids also raises environmental issues because they are considered pollutants.

Steam has been used to disintegrate and defiberize biomass. This is done under high pressure and at a high temperature exploding the fibers within the biomass. Because this procedure must be done at high temperatures, degradation products such as fuurfural and hydroxymethyl furfural are created. These degradation products are toxic and will inhibit fermentation even at very low levels, therefore they must be removed prior to any subsequent fermentation. The water wash streams used to remove the degradation products become toxic themselves and must be treated before they can be discharged from the processing facility. Besides the environmental cost, the use of steam is extremely costly because of the energy that is required which is not recoverable, and because of the equipment costs that are required to practice this technique.

Ammonia has also been used to explode and disintegrate fibrous biomass. This technique, known as AFEX for Ammonia Freeze Explosion, is performed under high pressure. The pressure and temperature required are dependent upon the substrate being treated. The process is generally performed at temperatures from 50°–90° C. This process does not degrade sugars and suffers from few, if any, adverse environmental effects. Nonetheless, the ammonia must be reclaimed and this entails certain costs. Further details of this technique are described in U.S. Pat. No. 5,037,663 issued to Bruce E. Dale, the subject matter of which is incorporated herein by reference.

Grinding methods have been tried to essentially chop the biomass into pieces small enough for effective sugar hydrolysis. These attempts have not resulted in commercially acceptable sugar yields even though the biomass has been ground to particle sizes as small as 37 microns This technique requires no chemicals, so chemical recovery is not a problem. The drawback to grinding is that it is very energy intensive, inefficient, and an expensive means of disintegrating fibrous biomass. Most grinding methods essentially cut the end off of the fiber bundle time after time. The fiber bundle is strongest perpendicular to the fiber axis, and it is in this perpendicular direction that most of the cutting is done. Moreover, there is a tendency to compress the biomass structure crushing the cracked and broken surfaces making them less susceptible to penetration by water and enzymes or chemicals. This compression effect is even more significant in biomass with higher lignin content due to the naturally recalcitrant, i.e. highly crystallized, nature of the lignin.

To achieve very small particle sizes, the biomass must be ground repeatedly. Consequently, such grinding consumes a great deal of energy making grinding simply uneconomical as a means of treatment. The cost of grinding is prohibitive based on the energy consumption alone, not taking into account equipment costs, including the cost of repair and general wear of the machinery.

Strong alkali agents have been used in conjunction with shear forces produced by an extruder device to both chemically and physically disintegrate fibrous biomass. This technique uses a mixture of a strong alkali and a peroxide combined with biomass. The technique requires solids loadings in excess of 30% solids. The alkali-peroxide/biomass broth is exposed to shear forces in an extruder device. An extruder forces the biomass through a pipe of decreasing diameter under great pressure and finally through a small orifice where there is a substantial pressure release. The extruder device has a masticatory effect on the biomass, grinding and chewing the particles. The extruder is particularly used for its mixing capabilities, i.e., dispersing the biomass in the alkali-peroxide mix. While producing high-shear forces, an extruder actually functions similar to a grinder. The resulting broth is then held in residence for up to 24 hours to complete the process.

This method requires the use of potentially toxic chemicals. It also may require extended treatment times, requiring that the resulting broth be held in residence for up to 24 hours. Recovery of the alkali and peroxide is not necessarily required, but special care must be used in handling these toxic chemicals. This method accordingly is expensive due to high energy costs and toxic chemical handling costs, and can be inefficient due to the time required for treatment. Further details of this technique are described in U.S. Pat. No. 4,997,488 issued to John M. Gould and Brian J. Jasberg, the subject matter of which is incorporated herein by reference.

High-frequency, rotor-stator devices have been used to aid in disintegrating the starch component of certain agriculture products like corn and tubers prior to refining the starch to alcohol. Corn and other starch-containing materials, however, have little or no lignin associated with their cell structure; and their cell structure is minimally fibrous when compared with a fibrous lignocellulosic biomass. Consequently, while starch-containing materials have been subjected to mechanical breakdown by the use of rotor-stator devices, it has been generally considered that these devices would not be effective in breaking down lignocellulose-containing materials. Moreover, the fibrous component of these materials has not been hydrolyzed and the accumulation of the fibrous component in the equipment has caused equipment failures.

Hardwood having a lignin content from 20–23% has been subjected to high-frequency, rotor-stator devices as an adjunct to furfural production. In these instances, the wood was first ground and the particles "cooked" with dilute acid at high temperature before use of high-frequency, rotor-stator devices. A rotor-stator device, known as a conical tool marketed under the trade name SUPRATON by Krupp Industrietechnik GmbH, was used primarily for its grinding and dispersion capability, i.e., to disperse the ground wood particles in the high temperature, acid broth. This process has the same drawbacks as the dilute acid process because it requires separation of the acid and toxic by-products from the desirable sugars. The process also creates a toxic waste stream resulting from the separation of the sugars from the mix. Furthermore, the effectiveness of this method was minimal.

SUMMARY OF THE INVENTION

The present invention in a general aspect comprises a method of reducing the particle size of a fibrous biomass containing lignocellulose through internal disruption of the fibrous structure, wherein an aqueous slurry of particles of the biomass is injected cross-currently into a turbulent Couette flow of the slurry. The injected slurry is also preferably in turbulent flow. The Couette flow occurs in a narrow channel or gap between a first stationary surface and a second surface traveling at high speed. The resulting forces generated have proven very effective in not only reducing the particle size of a fibrous biomass but also shearing or splitting the fibers in such a way that the cellulose in the biomass becomes especially exposed or susceptible to subsequent hydrolysis.

Preferably, the biomass is mixed with a liquid to form a slurry and then forced to be injected into a succession of the channels or gaps mentioned above. Thus, once a quantity of biomass has been injected into a first channel or gap and mixed with another quantity of biomass traveling in turbulent Couette flow, a first portion of the resulting first mixture is injected into a second such channel to mix with still another quantity of the biomass. At the same time, a second portion of the first mixture continues to flow in the first channel, where it preferably encounters an injection of still another quantity of the biomass.

Preferably, all of the stationary surfaces and rapidly moving surfaces which define the Couette channels or gaps form parts of a stator and a rotor, respectively. Several actual devices which incorporate such stators and rotors are machines currently available under the names SUPRATON™ and DISPAX P/2™. All of these devices have a plurality of generally parallel channels defined between a stator and an adjacent rotor by lands or walls which run around each stator and rotor. Each such land or wall is crenelated to provide a plurality of openings for slurry to either enter into a channel between the lands or to exit from that channel to an adjacent channel. In operation, pulses or slugs of slurry are injected into a given channel to generate pressure pulses in the channel. Then, as the mixed slurry in the channel moves and lines up with an opening leading to the next channel, a slug of the mixture exits the first channel and enters into the next channel where it is injected into a new body of slurry in turbulent Couette flow. This pulsing type of flow from one channel to the next produces microcavities with extremely intensive energy zones causing the slugs to experience pressure changes which, it is concluded, cause fibers in the slugs to erupt and shear axially. The several mechanisms that occur in this system are not entirely understood, but the results in terms of shredding the fibers in a biomass and improving the hydrolysis of cellulose components in the biomass have been unexpectedly significant. It has been especially noted that the fibers have been sheared axially as well as transversely, thus opening the fibers to a marked degree. It appears that the pulsing, turbulent nature of the overall flow pattern gives rise not only to high-shearing actions but also to microcavitational effects which promote fiber destruction.

There is minimal grinding in the process of the invention, because the rotor and stator are never in contact during use and may be separated by as little as approximately 1 mm. High-shearing forces created by the rotor in each ring-shaped path shred the fibrous particles as they pass from one path to the next. As they pass from one ring to another, microcavitation forces help to explode the fibrous particles concurrently with the shearing action.

The explosive effects of the high-shear forces generated create particles that vary in size from very fine, about 1–5 microns, to relatively large, about 1–2 mm. The forces shatter and shred the biomass creating irregular size particles. The particles also exhibit greatly increased surface area due to the internal disruption of the fibers, allowing easier penetration by the enzymes used in sugar hydrolysis.

BRIEF DESCRIPTION OF THE DRAWINGS

FIGS. 5–8 are graphic representations of the results of examples 1 and 2.

DETAILED DESCRIPTION OF THE INVENTION

As stated above, the present invention uses high-frequency, rotor-stator shearing technology in the treatment of a lignocellulosic biomass. This type of device produces high-shear, microcavitation forces which disintegrate the biomass fed into it. Two commercially produced high-frequency, rotor-stator dispersion devices are the Supraton™ devices manufactured by Krupp Industrietechnik GmbH and marketed by Dorr-Oliver Deutschland GmbH of Connecticut, and the Dispax™ devices manufactured and marketed by Ika-Works, Inc. of Cincinnati, Ohio.

Raw materials for the present process comprise cellulose-containing materials such as hay, sugar cane bagasse, crop residues, newsprint, paper, sewage sludge and yard wastes. Preferred is non-woody biomass which pertains to cellulose-containing material having generally a lignin content of 18 percent or less. Thus, biomass in the form of tree bark or wood chips from trees would not be preferred starting materials for the present process, although it is contemplated that cellulose-containing material from woody plants such as aspens and other ashes would be suitable for the present treating process.

To prepare the biomass for shearing, the biomass is first reduced to a manageable size by grinding to remove tramp materials which might damage the rotor-stator shearing device or devices. Grinding to a desired particle size may be accomplished in one or more stages. A particularly small particle size is not required nor desired for the material introduced into the process. The particle size preferred in the use of the process of the present invention may vary depending on the biomass substrate. In a general aspect of the process, the milled biomass is ground by conventional hammermilling to a particle size sufficiently small enough to pass through a number 4 mesh sieve.

The ground product is preferably mixed with water to obtain a slurry of a desired solids content. One of the purposes of this portion of the process is to swell and further defibrate the biomass. In a preferred embodiment, the ground biomass is fed into a hopper and conveyed to a mixer-grinder-pump and water added to form a slurry having a solids content ranging from about 10% to about 25% solids. In a particularly preferred embodiment, the mixer-grinder-pump is a medium shear, rotor-stator device capable of mixing and pumping high solid content slurries. This device further reduces the particle size of the biomass, wets the particles thoroughly with water, and disperses the particles within the water. Examples of this type of device are the HED™ manufactured and marketed by Ika Works, Inc. of Cincinnati, Ohio and the Gorator™ manufactured by Krupp Industrietechnik GmbH and marketed by Dorr-Oliver Deutschland GmbH of Connecticut.

Figure 1:
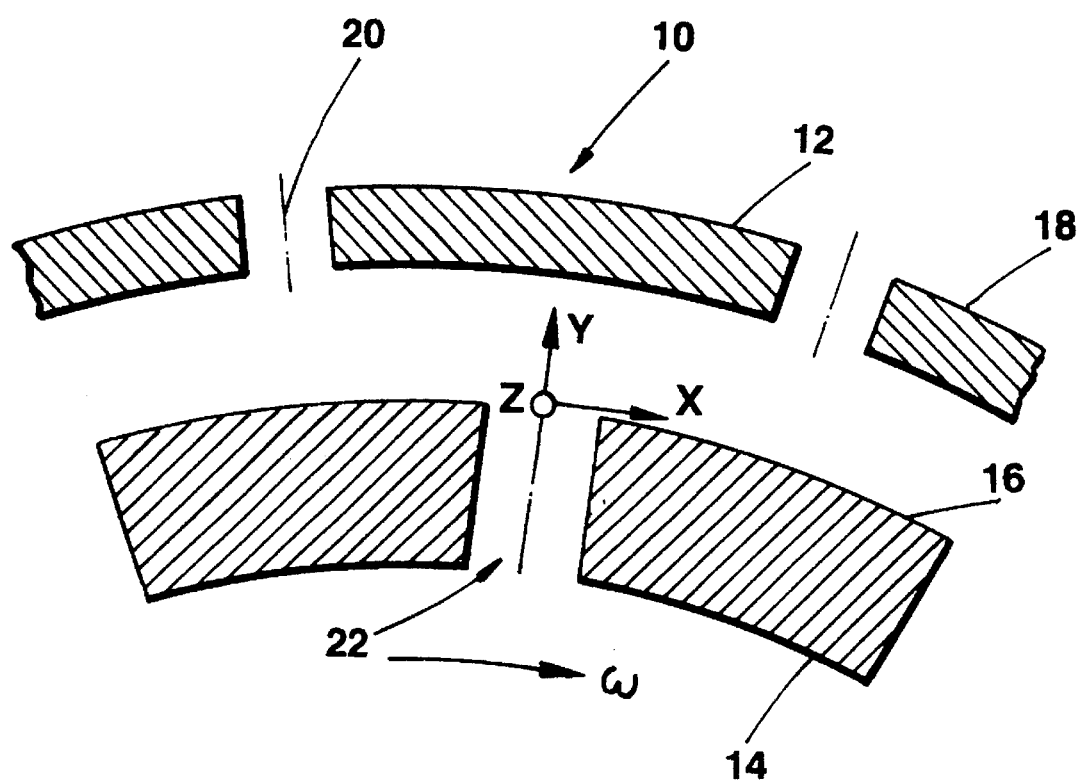
FIG. 1 is a schematic axial view of a portion of a rotor/stator device.
Figure 1A:
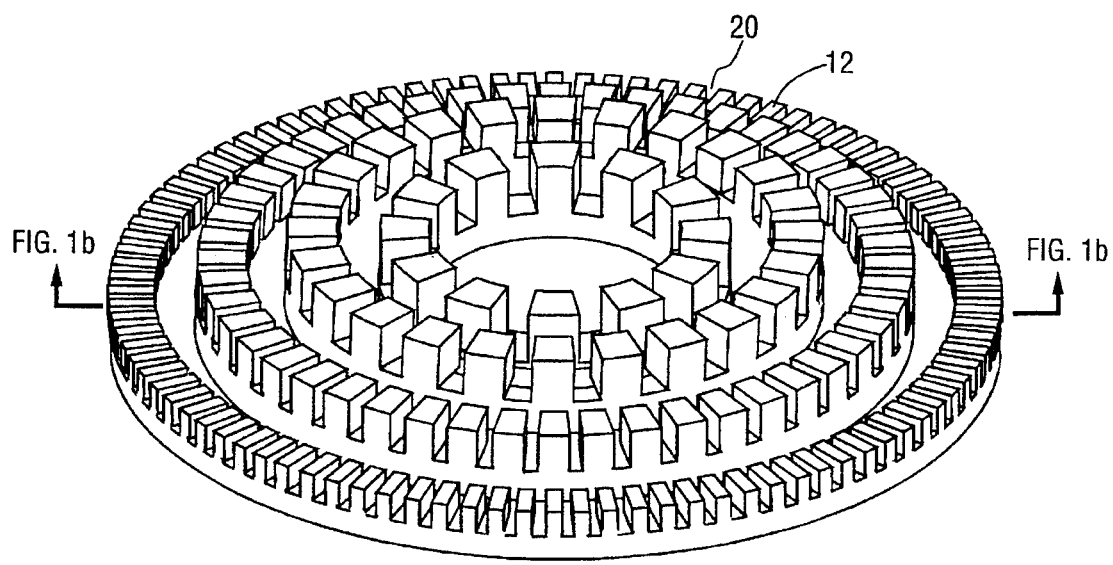
FIG. 1A is a perspective view of a tooth and chamber tool for a stator.
Figure 1B:
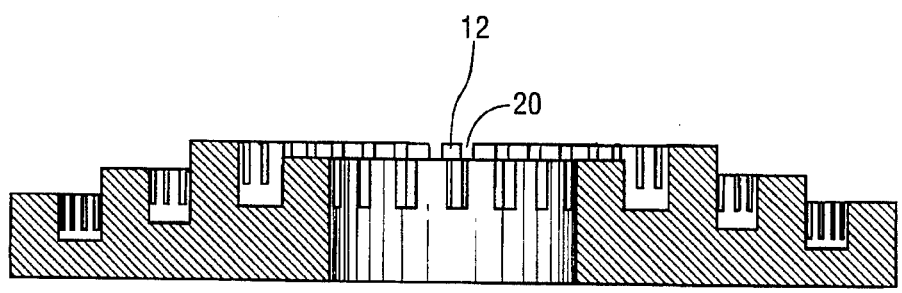
FIG. 1B is a section view of FIG. 1A through section lines 1D–1D.
Figure 1C:
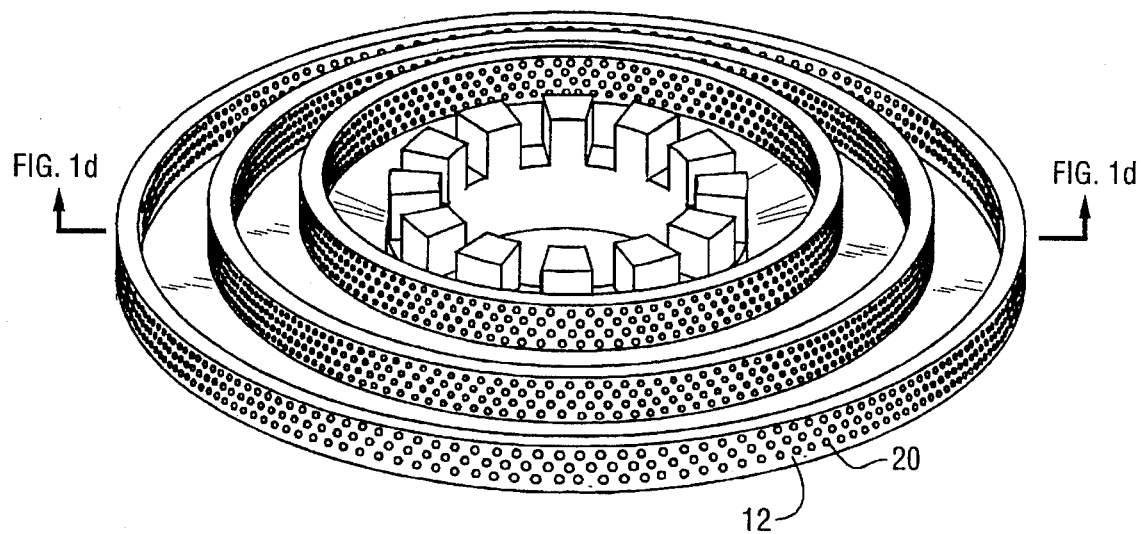
FIG. 1C is a perspective view of a nozzle tool for a stator.
Figure 1D:
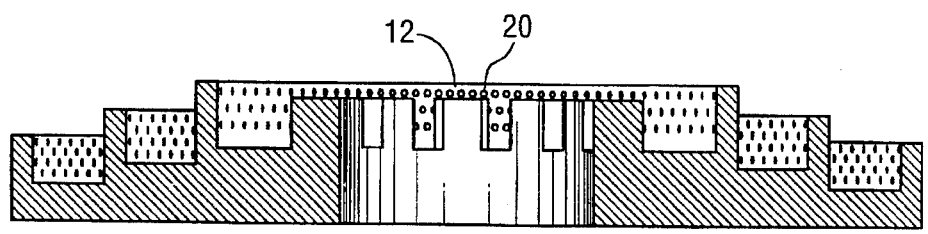
FIG. 1D is a section view of FIG. 1C through section lines 1D–1D.

In a preferred embodiment of the process, the slurry is pumped into a high-frequency, rotor-stator dispersion device operated within the sonic range of frequency where it is subjected to the high-shear mixing of two turbulent streams as described earlier. As mentioned earlier, preferred high-frequency, rotor-stator dispersion devices are the Supraton™ and the Dispax™ devices. Referring to FIG. 1, a slurry is fed into the high-frequency, rotor-stator device and forced into a chamber 10. Inside the chamber is a series of coaxial meshing rings. The rings may be configured with teeth, slots or bore holes.

The rings configured with teeth are generally known as tooth and chamber tools and those configured with bore holes are generally known as nozzle tools. Generally, tooth and chamber tools will be attached to both the rotor and the stator when tooth and chamber tools are used. When nozzle tools are used, generally, a tooth and chamber type tool is affixed to the rotor and a nozzle tool will be affixed to the stator.

The rings are concentric, radiating out from the center. The rings 12 on the stator are fixed and the rings 14 on the rotor are rotated by a shaft coupled to a motor.

The structure identified as 16 is representative of a tooth on a tooth and chamber tool attached to the rotor. The structure identified as 18 is representative of both a tooth on a tooth and chamber tool attached to the stator and the body of a nozzle tool spaced between bore holes. Accordingly, the space identified as 22 represents the gap between the teeth on a tooth and chamber tool attached to the rotor. And, the space identified as 20 represents both the gap between teeth on a tooth and chamber tool attached to the stator and the gap formed by a bore hole in a nozzle tool attached to the stator. The rings 14 on the rotor and the rings 12 on the stator are closely spaced at close tolerances. The space between the rotor and stator is typically about 1 mm.

Regarding a tooth and chamber tool, adjacent pairs of teeth are separated by gaps 20 and 22. The tooth and gap size determine the coarseness of the machine, i.e., a coarse tool has fewer teeth with larger gaps between adjacent teeth when compared with a medium or fine tool. Both the Supraton™ and Dispax™ allow the use of coarse, medium, and fine toothed rings in the same device, or the devices can have all coarse, all medium, or all fine toothed rings in the chamber so that the machines may be used in series, if desired. The use of multiple devices in series is preferred to the use of a single device for processing biomass.

As the biomass slurry is pumped under pressure into the chamber 10 by the mixer-grinder-pump, it encounters each concentric layer of the tools in place in the chamber as the slurry is forced laterally. This lateral force is created by the pressure on the slurry as it is pumped into the chamber by the mixer-grinder-pump and by the centrifugal force created by the spinning rotor. The slurry passes through the gaps between the teeth as the rotor spins past the gaps in the stator. Flow is most pronounced when the gaps 22 between the rotor teeth align with the gaps 20 in the stator. The result is a pulsing flow with a rapid succession of compressive and decompressive forces. The lignocellulosic material in the slurry is subjected to these repeated forces, as the centrifugal force accelerates it through the gaps toward the outer edge of the chamber. As the slurry moves towards the outer edge of chamber 10 the centrifugal forces increases, thus intensifying the forces generated in gaps 20 and 22. The repeated compressive and decompressive forces create microcavities in the slurry with extremely intensive energy zones. The lignocellulosic fibers are ripped apart by these forces. Additionally, the resulting fibers exhibit extensive internal decrystallization due to the forces generated in the microcavities.

As the lignocellulosic particles pass outward through the various gaps, they may come in contact with the teeth and the body of the nozzle tool. Accordingly, some grinding of the particles may occur due to such contact. The grinding effects are relatively small, however, when compared with the combined effects of shear forces and microcavitation. Nonetheless, as solids loadings increase the instance of grinding may also increase.

Grinding typically cuts, slices, and dices fibrous material perpendicular to the fiber bundle, producing a more spherical type of particle. Shear forces in combination with microcavitation, on the other hand, tend to shatter the material, that is, they rip the fibers apart from the inside-out explosively forming irregularly shaped particles. Examination of these particles show them to have been "cut" both perpendicular to the fiber axis and longitudinally along the fiber axis. The effect on the fibers is to shatter their structure, disrupting the lignin bonding to cellulose and possibly the cellulose bonding to hemicellulose without the compressive effects of grinding. Solids loadings not exceeding 30% are particularly preferred to minimize grinding of the biomass and thus the compressive effects of the grinding.

While the precise mechanisms occurring within the chamber of the high-frequency, rotor-stator device are not totally understood several factors are thought to aid in the explaining the effects on the treated biomass. The swelling effect of liquids, particularly water and dilute alkaline solutions, is thought to aid in creation of longitudinal shearing effects in the treated biomass. The repeated compressive and decompressive events in and between the gaps are thought to create internal pressures tending to explode the biomass particles and thus the fibrous structure thereof. It is also hypothesized that a harmonic resonance effect may be created during operation of the rotor-stator device in the sonic range. Thus, a harmonic frequency of a particular fiber length when reached during processing would cause the effected fibers to resonate and tend to aid in the destruction of the fibrous structure of the biomass.

As previously stated, high-frequency, rotor-stator dispersion devices may have differently configured rings or "tools" within the chamber. These tools, for example, may vary in the gap size between the teeth on the rings or in bore hole size in the case of a nozzle tool. With a larger gap size, the resulting material is more coarse than with a smaller gap size. As stated earlier, these tools can be varied within one device to contain coarse, medium, and fine rings in the chamber of the device. Likewise, a device may contain rings of the same rating so that the devices can be staged. This capability is important for use in a continuous process.

Processing a fibrous biomass through one or more of the high frequency, rotor-stator dispersion devices renders the fibrous material especially well suited for subsequent hydrolysis of the cellulose components. The fibers have been thoroughly shredded, and the associated cellulose material is readily available for hydrolytic attack. Thus, the treated biomass may be made to undergo acid or enzymatic hydrolysis or direct microbial conversion to produce $C_5$ and $C_6$ sugars. These sugars may then be fermented and distilled into fuel ethanol. Use of the pretreatment process of the present invention typically reduces the need for other treatments normally used to prepare a biomass for hydrolysis; however, the use of the prior art pretreatment processes may nevertheless be combined with the present process as thought necessary by one of ordinary skill in the art.

One benefit of the method of the invention lies in the ability of the high-frequency, rotor-stator dispersion device to handle high-solids content slurries. This capability facilitates the recycling of previously treated lignocellulose-containing material by allowing the addition of previously treated matter to a newly created slurry. This addition to the newly created slurry increases the solids content of the slurry that enters the high-frequency, rotor-stator dispersion device. In the method of the present invention, solids loadings preferably should not exceed 30%. The preferred range of solids loadings is from about 10 to 20% solids.

Generally, continuous processing is favored because it requires less down time for equipment cleaning and other procedures that must be done between batches. Consequently, continuous processing is more efficient and economical. Because the method of the invention allows for recycling of previously treated biomass, the method of the invention may be used in continuous, fed-batch, semi-batch, or batch processing. Consequently, the present invention offers the operator flexibility in how the processing plant is set up and operated.

The method may be practiced over a broad range of temperatures. Where the method is practiced without enzymes, the temperature should preferably not exceed 90° C.; however, the method could be practiced at higher temperatures, if so desired. The limiting factor is that above 90° C., the proteins and sugars in the biomass become adversely affected. Where the method is practiced with enzymes, the temperature may range between about 47° C. to 62° C. but the temperature should preferably not exceed 50° C. The limiting factor is the deactivation temperature of the enzyme or enzymes used. Accordingly, as enzymes are developed that are active at higher temperatures, the method will be able to be practiced at the higher temperatures.

Figure 2:
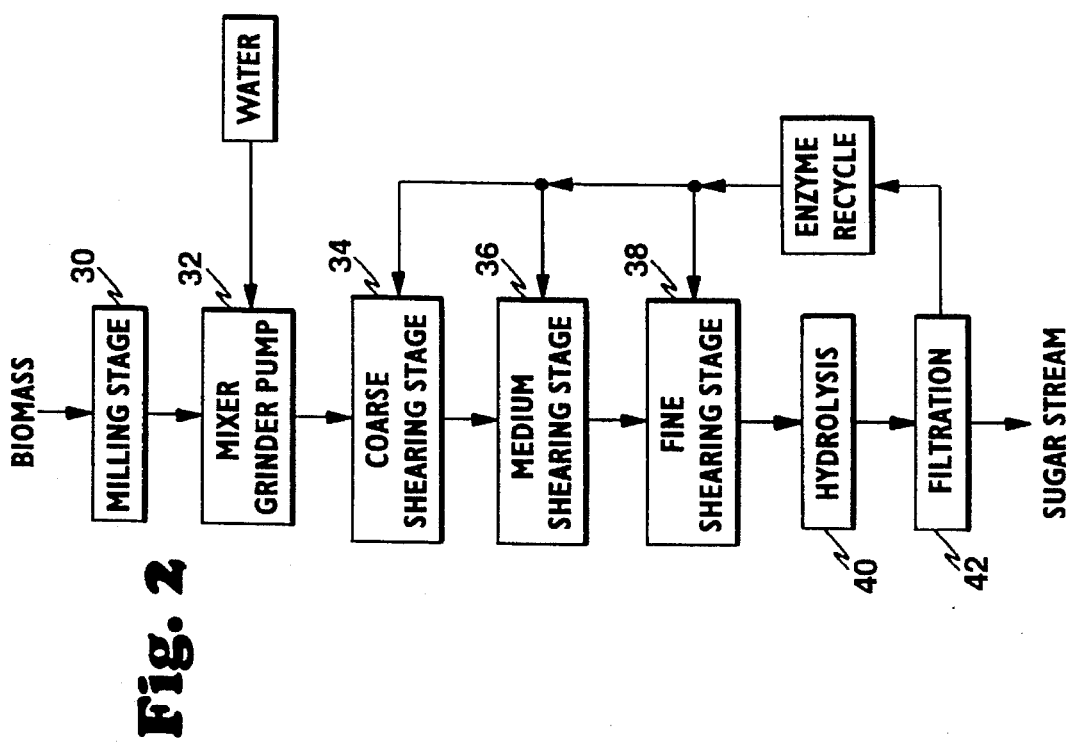
FIG. 2 is a flow diagram depicting an example of the invention carried out in the presence of water alone.

FIG. 2 illustrates an embodiment of the invention which is generally preferred for use on biomass of 18% or less lignin content. In this embodiment a fibrous lignocellulosic biomass is ground in stage 30 to a manageable size, preferably to 4 mesh. This ground biomass is combined with water in a mixer-grinder-pump in stage 32 to form a slurry. The resulting slurry is then pumped to a holding tank where the pH of the slurry is titrated to a pH of about 5 and the slurry is pasteurized at a temperature not to exceed about 90° C. for approximately 30 minutes. The slurry is then allowed to cool to about 50° C. where it is introduced to the shearing stage. The slurry is sheared in rotor-stator devices, passing through a coarse device 34, then a medium device 36, and finally a fine device 38, recycling the slurry through the devices as needed. During the shearing stages, the pH should be maintained at about a pH of 5.

Devices 34–36 are representative of how the present process may be configured; however, the precise number of devices and the configuration of each device is not critical to the success of the process. Preferably, the early devices in series will be coarse tooth and chamber type devices, the middle devices will be of medium coarseness of the tooth and chamber type or nozzle type, and the end devices will be fine nozzle type devices with small bore holes. Moreover, the biomass may be recycled through the series of devices or a device as necessary.

As explained earlier, the complex forces created by a rotor-stator device shatter, shred, and disintegrate the lignocellulose particles in the slurry. The net effect has been unexpected, literally exploding the fibers and ripping them apart. Electron microscope studies show that the effect begins internally within the fibers and show internal decrystallization of the individual fibers. The resulting particles are very irregular in size due to the internal disruption of the fibrous structure and, most importantly, the reactive surface area of the fibers is greatly increased.

Following the shearing stages, the lignocellulose particles may be treated with a suitable enzyme such as cellulase and hydrolyzed 40. Alternatively, the slurry from stage 38 may be blended with an enzyme and further sheared in a rotor-stator dispersion stage before being hydrolyzed.

Following hydrolysis, the biomass is separated by filtration or other suitable technique 42 into a retentate and a filtrate containing soluble sugars. The retentate may be recycled back to the shearing stages for further processing. Lignocellulose particles treated with cellulase are typically laden with useful enzymes following such treatment. Typically, the enzymes remain tightly adsorbed onto the remaining biomass fibers. Recycling the previously treated material through one or more shearing stages aids in separation of the enzymes from the biomass particles. Once removed from the biomass particles, the enzymes may be simultaneously blended with freshly treated biomass. Thus, recycling enables reuse of enzymes and more complete breakdown of cellulose and hemicellulose.

Figure 3:
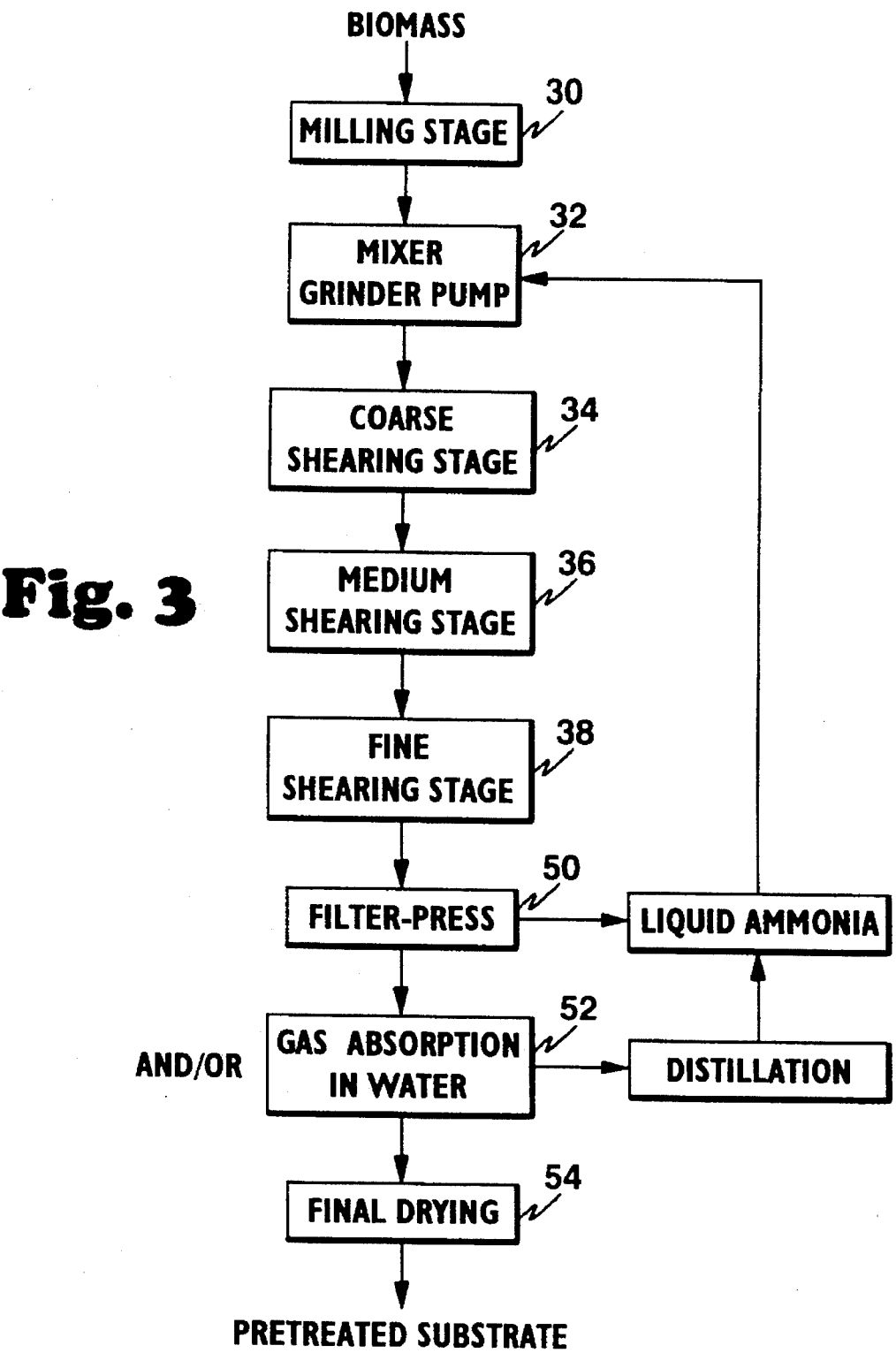
FIG. 3 is a flow diagram depicting an example of the invention carried out in the presence of liquid ammonia.
Figure 5:
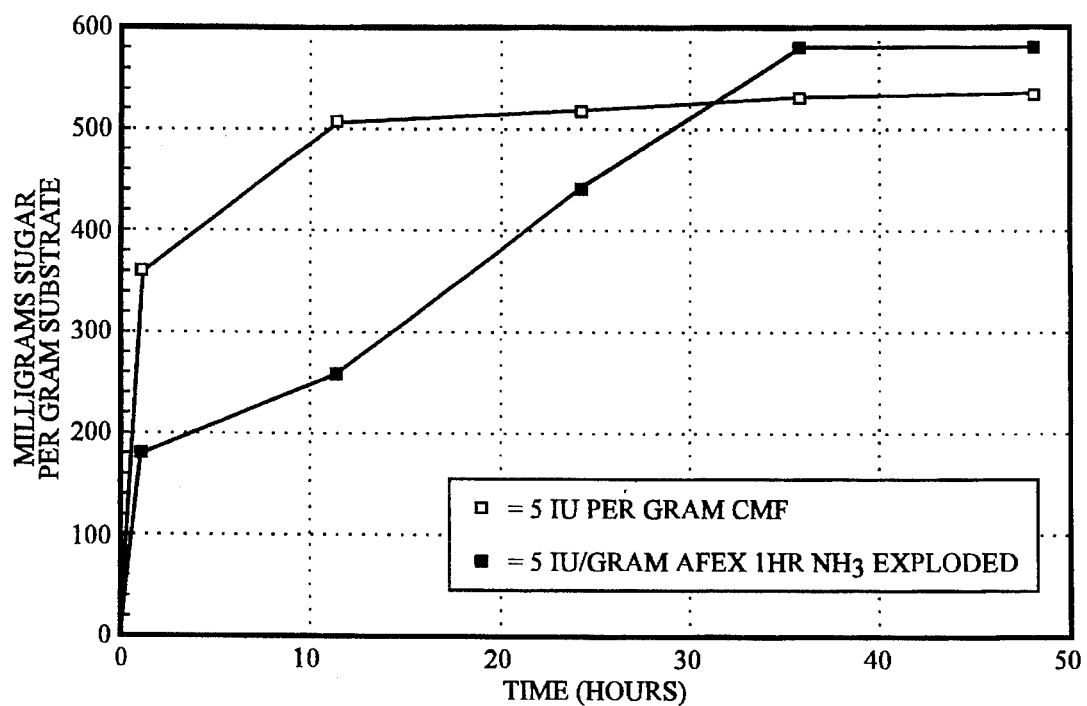
FIGS. 5–8 compare sugar hydrolysis results of biomass samples treated using the method of the present invention and samples treated using a method of the prior art applying different operating parameters.
Figure 6:
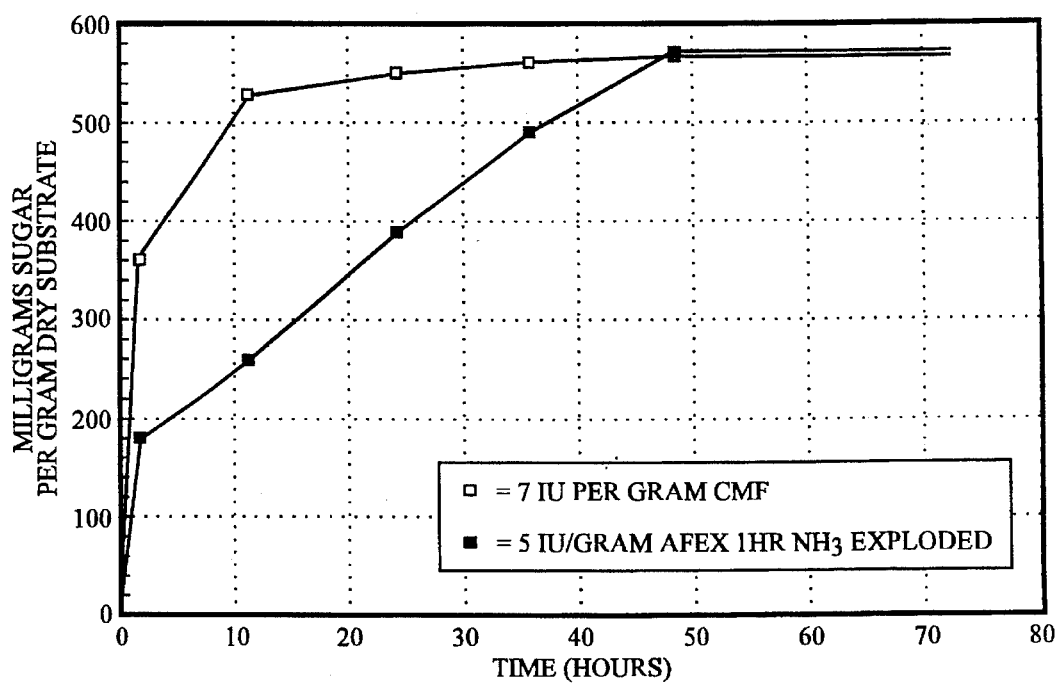
Figure 7:
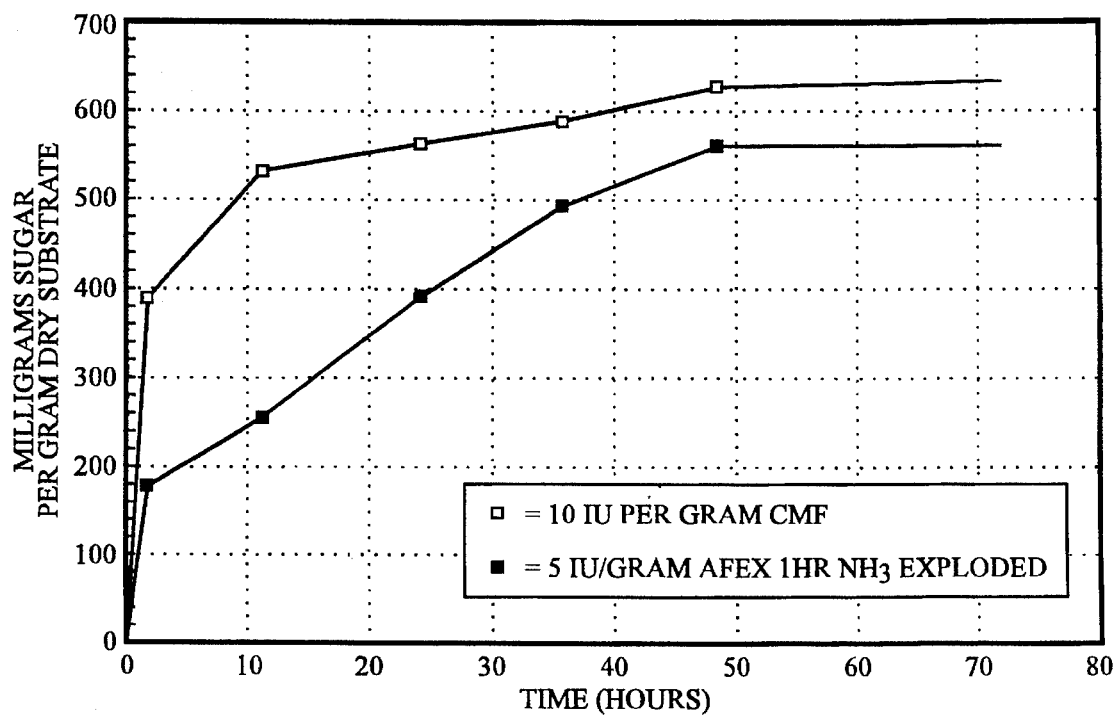
Figure 8:
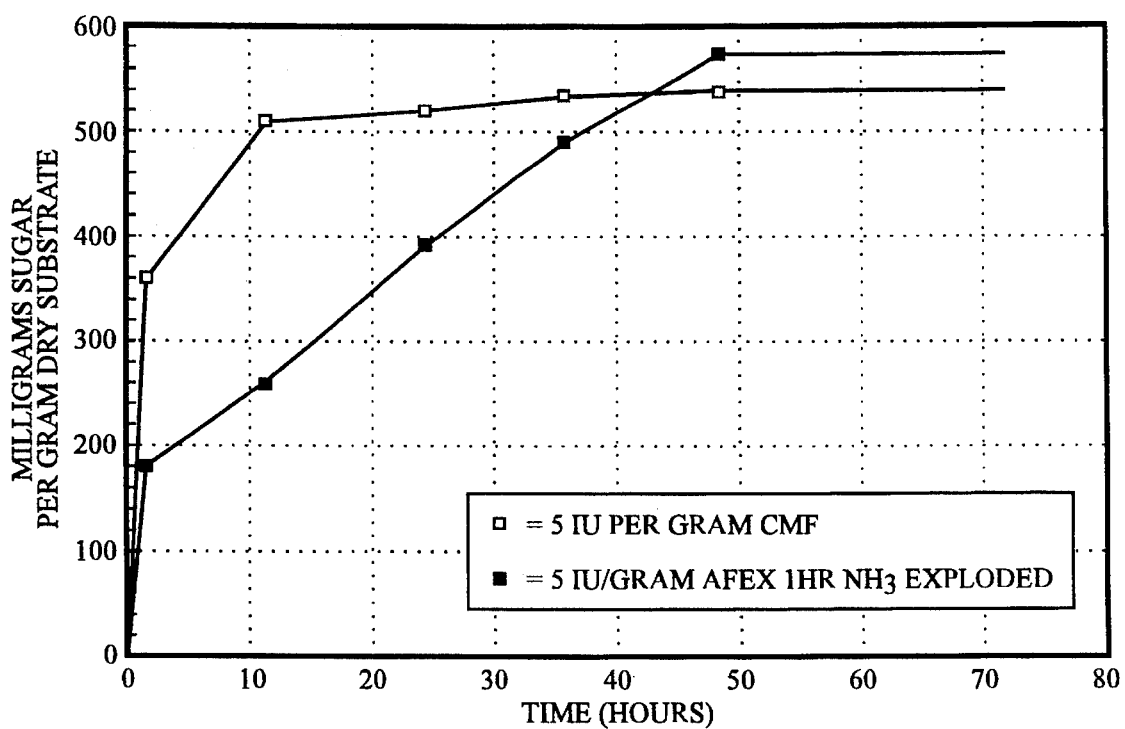

FIG. 3 depicts an embodiment of the process which is particularly effective for use with all fibrous lignocellulosic biomass. After grinding the biomass in stage 30, a slurry is produced in stage 32 by mixing the ground biomass with liquid ammonia. The resulting slurry may contain up to about 30% solids. The slurry is pumped into one or more shearing stages in accordance with the invention, preferably using a coarse rotor-stator device, then a medium device, and finally a fine device, recycling the slurry as needed. The ammonia slurry is then filtered 50, preferably using a Tube Filter Press by English China Clays of England to remove the majority of the liquid ammonia although other methods, such as pressure-contained filter pressing or belt pressing could be used. Remaining ammonia is gasified and removed by water absorption 52. Any further remaining liquid ammonia may then be removed by lowering the pressure on the particulate substrate in a drying stage 54.

The resulting dried substrate containing sheared lignocellulose particles may be passed directly to hydrolysis. Alternatively, the dried substrate may be further sheared by using one or more high-shear, rotor-stator devices in the presence of water alone or water and enzymes prior to hydrolysis.

Ammonia is known to have a favorable swelling effect on the biomass particles, to aid in decrystallizing the cellulose and to aid in the explosive disruption of the fibrous structure. Accordingly, when combined with the present process liquid ammonia is anticipated to provide outstanding results. Furthermore, it is anticipated that soaking certain types of biomass in liquid ammonia prior to pretreatment according to the present invention will improve the sugar yields of the biomass.

Figure 4:
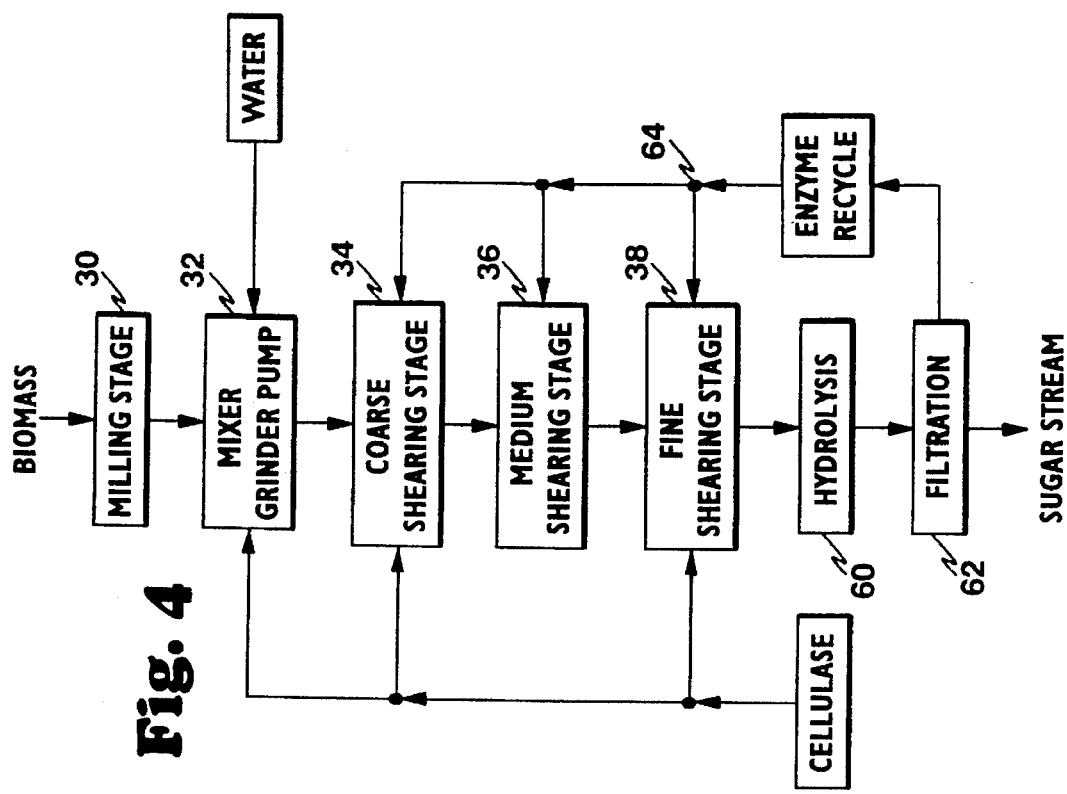
FIG. 4 is a flow diagram depicting an example of the invention carried out in the presence of water and enzymes.

FIG. 4 depicts an embodiment of the process which is preferred for initiating enzymatic hydrolysis. In Stage 30 lignocellulose-containing biomass is ground. A slurry is created using water and additionally, enzymes in a mixer-grinder-pump in stage 32. Cellulase, cellobiase, or preferably, a combination of the two enzymes is added to the slurry before exposure to the high-frequency, rotor-stator dispersion device. It is contemplated that these enzymes may be added directly into the shearing stages, in addition to the slurry. This allows for titration to achieve effective enzyme levels. In addition to the enzyme, a surfactant is added to slurry. The oleate esters of sorbitol are preferred and Tween (20) and Tween (80) are especially preferred. The amount of surfactant added will vary, but a concentration of about 0.01% to about 0.05% (wt/slurry wt) is preferred. The purpose of the addition of the surfactant is to reduce the adsorption of enzyme onto the substrate. By adding surfactant, the enzymes remain more active thus shortening the time required for enzymatic hydrolysis.

The slurry is pumped into one or more shearing stages, preferably a coarse rotor-stator device, then a medium device, and finally a fine device, recycling as necessary. The benefits of this process are that the lignocellulosic particles are shattered and shredded while they are being exposed to the enzymes. It is contemplated that this process will be more efficient than treating the biomass by subjecting it to high-shearing forces, then treating the resulting substrate with enzymes. By combining the shearing step with hydrolysis, this process should save time and the energy inputs required to shred the biomass in the treatment process. The temperature should be monitored throughout this process and should not exceed about 50° C. to avoid temperature deactivation of the enzymes.

Following the shearing stages, the enzyme laden substrate is passed into a further hydrolysis stage 60. After hydrolysis, the biomass is separated by filtration or other suitable technique 62 into a retentate and a filtrate. The retentate may be recycled back into the shearing stages as seen in stage 64. Lignocellulose particles treated with cellulase are typically laden with useful enzymes following such treatment. Recycling these particles enables reuse of the enzymes and more complete breakdown of the lignocellulose.

An additional benefit of this process is that new material may be added to the slurry while, at the same time, material that has been already treated with the enzymes may be recycled back into the shearing stages allowing for continuous processing. The enzymes used are expensive and have a short half-life. The ability to process the material continuously and recycle enzyme containing substrate lengthens the useful life of the enzymes by making their reuse practical. Further, it is contemplated that this will allow more thorough sugar hydrolysis of the substrate because the biomass particles are continually exposed to the enzymes by way of recycling the treated particles through the process. The result is a more efficient process.

This process allows continuous processing which, in turn, will allow biomass refining on a larger scale than that allowed by batch processing. Continuous processing is more efficient than batch processing because the system does not have to be shut down and readied for another batch.

It is an advantage of the method of the invention that it can be done with water alone and without the use of acids or alkali as have been used in the prior art. However, the method of the invention is flexible enough to encompass the use of acids or alkali and to some advantage.

The use of acids and alkali have generally been directed toward woody biomass with lignin content of 18% or more. Both acids and alkali are effective for lignin removal. As is well known to those skilled in the art, acids and alkali are also effective to aid in the hydrolysis of the $C_5$ sugars in biomass. The use of acids and alkali may be used to advantage in the present process. Due to the effects of the forces generated in the process on the biomass, it is anticipated that either acids or alkali would have greater access to the lignin and cellulose/hemicellulose in any biomass treated, thus greatly increasing the effectiveness of these pretreatments without also producing furfural and hydroxymethyl furfural which result the higher temperatures required by the prior art.

Thus, in the case of alkali, a ground lignocellulosic biomass is added to a solution of a non-volatile alkali, for example $Ca(OH)_2$ or NaOH to form a slurry. The slurry may contain up to 10% by weight alkali but preferably would be in the range of from 1% to 3%. The solids loading of the slurry should not exceed 30% and preferably be about 16% after soft-filtering and removing the excess moisture.

Once the biomass is thoroughly wetted with the alkali solution, the slurry is held in residence for up to 3 hours but preferably for about 1 hour at a temperature up to 90° C., but preferably at about 80° C. The resulting slurry is sheared in a series of rotor-stator devices, passing through a coarse device, then a medium device, and finally a fine device, recycling as necessary. It is contemplated that the alkaline reagent will be recovered through a chemical separation process or where the alkali loading is minimal, the alkali will be neutralized with an appropriate acid. Following chemical separation or neutralization a final drying step is used. The resulting dry lignocellulose particles may be passed directly to hydrolysis. Alternatively, the dry particles may be further sheared in one or more high-shear, rotor-stator devices in the presence of water alone or water and enzymes prior to hydrolysis.

Acids may be used with the present method for all fibrous lignocellulosic biomass. In the case of a lignocellulosic biomass containing 18% or more lignin, the biomass is ground and a slurry is created by combining the ground biomass with up to 4% by weight of an appropriate concentrated acid. The pH of the slurry should be maintained in a range from a pH of about 1.8 to a pH of about 4.2. The slurry is held in residence for up to 3 hours preferably about 1 hour at temperatures up to 120° C. but preferably about 80° C. The solids loadings of the slurry should not exceed 30% and, preferably be about 17% after soft-filtering and removing the excess moisture. The slurry temperature is allowed to decrease to a range of from 47°–62° C. The resulting slurry is sheared in a series of rotor-stator devices, passing through a coarse device, then a medium device, and finally a fine device, recycling the slurry as needed. The slurry is centrifuged to remove the acid leaving behind a particulate substrate. Water is added to the particulate substrate to form a slurry. The slurry is sheared in a series of rotor-stator devices, passing through a coarse device, then a medium device, and finally a fine device, recycling the slurry as needed.

In the case of hay generally and Coastal Bermuda grass hay in particular, the biomass is ground and a slurry is created by combining the ground biomass with up to 2% by weight of an appropriate concentrated acid. The pH of the slurry should be maintained in a range from a pH of about 2.8 to a pH of about 5.2, but preferably maintained at about 4.8. The slurry is held in residence for up to 3 hours preferably about 1 hour at temperatures up to 90° C. but preferably about 80° C. The solids loadings of the slurry should not exceed 30% and, preferably be about 17% after soft-filtering and removing the excess moisture. The slurry temperature is allowed to decrease to a range of from 47°–62° C. The resulting slurry is sheared in a series of rotor-stator devices, passing through a coarse device, then a medium device, and finally a fine device, recycling the slurry as needed. The slurry is centrifuged to remove the acid leaving behind a particulate substrate. Water is added to the particulate substrate to form a slurry. The slurry is sheared in a series of rotor-stator devices, passing through a coarse device, then a medium device, and finally a fine device, recycling the slurry as needed. The resulting lignocellulose particles may be passed directly to hydrolysis. Alternatively, the particles may be further sheared in the presence of water and enzymes prior to hydrolysis. The resulting treated lignocellulose particles may be passed to enzymatic hydrolysis. Alternatively, the particles may be further sheared in the presence of water prior to enzymatic hydrolysis.

The following examples describe actual systems studied for treating lignocellulosecontaining biomass and illustrate the invention in more detail. The examples are based on work with coastal bermuda grass; however, the principles ascertained have application with other lignocellulose-containing biomass as well. The invention is a broad concept and is applicable to treating lignocellulose-containing biomass in general. The following examples, accordingly, shall not be construed as limiting the scope of the invention.

EXAMPLE 1

Coastal bermuda grass hay was ground to a particle size sufficiently small enough to pass through size 40 mesh sieve and mixed in tap water to create a slurry of approximately 14% solids. This material was fed, without heating through a progressive-cavity pump which introduced the slurry into a Dispax™, a high-frequency, rotor-stator device, manufactured and marketed by Ika Works, Inc. of Cincinnati, Ohio. The slurry was circulated through one Dispax™ device. The Dispax™ had coarse, medium, and fine rings in the chamber.

Following treatment in the Dispax™ device, the sample was pasteurized at 80° C. and a buffer added to bring the pH of the mixture to 5.0. The samples were divided into three separate samples of equal amount. One sample was treated with 5 International Units of cellulase per gram of dry hay. Fifteen IU's of cellobiase was added in the sample brought to a temperature of 50° C. A second sample was treated with 7 International Units of cellulase per gram of dry hay.

Twenty-one IU's of cellobiase was added and brought to a temperature of 50° C. A third sample was treated with 10 International Units of cellulase per gram of dry hay. Thirty IU's of cellobiase was added to the mixture and the entire mixture was brought to a temperature of 50° C. Aliquots were taken at periods of 8 minutes, 60 minutes, 12 hours, 24 hours and 48 hours, and the resulting sugars measured by total reducing sugars (DNSA) analysis.

The results were compared against published results for ammonia explosion treatment of coastal bermuda grass followed by enzymatic hydrolysis. The ammonia explosion process was performed wherein the ammonia was in a 1:1 ratio with the biomass. After treatment, the substrate was hydrolyzed with 5 International Units of cellulase per gram of dry hay. Additional cellobiohydrolase was added and the mixture brought to a temperature of 50° C. Aliquots were taken at 8 minutes, 60 minutes, 12 hours, 24 hours, and 48 hours, and the reducing sugars measured by total reducing sugars (DNSA) analysis. The results were measured in milligrams of sugar per gram of dry substrate.

Tables 1, 2 and 3 present the results obtained in the above studies. Thus, the use of high-shearing forces in water provided sugar yields equal to the ammonia explosion treatment, and faster initial sugar yields.

EXAMPLE 2

The treatment was performed exactly the same as in Example 1. The sample was then pasteurized to 80° C. and a buffer added to bring the pH to 5.0. The sample was then treated with 5 International Units of cellulase per gram of dry hay. Additional cellobiohydrolase was added and the sample was brought to a temperature of 50° C.

The results were compared against published results for ammonia explosion treatment of coastal bermuda grass hay. For this experiment, however, the ammonia explosion process was performed with an ammonia to hay ratio of 2:1. The sample was then treated with 5 International Units of cellulase per gram of dry hay. Additional cellobiohydrolase was added and the entire sample was brought to a temperature of about 47°–48° C. Aliquots were taken from each sample at 8 minutes, 60 minutes, 12 hours, 24 hours and 48 hours, and the resulting sugar content of each aliquot was measured by total reducing sugars (DNSA) analysis.

The results were expressed in milligrams of sugar per gram of dry substrate.

Table 4 presents the results obtained in the above study. Thus, the use of high-shearing forces in water produced sugar yields superior to the 2:1 ammonia explosion treatment for the first 40 hours of hydrolysis.

The foregoing was for purposes of illustrating the invention. Those skilled in the art will recognize that various modifications can be made to the invention, and all such modifications are incorporated within the spirit and scope of the invention.

What is claimed is:

1. A method of treating a fibrous lignocellulosic biomass to make it more susceptible to hydrolysis, comprising the following steps:
   a) providing a ground fibrous lignocellulosic biomass;
   b) mixing said ground biomass with water to produce a slurry; and
   c) subjecting said slurry to high-shear forces by injecting said slurry cross-currently into a turbulent Couette flow created in a high-frequency, rotor-stator device under conditions to microcavitate the slurry to shatter the fibrous structure of the biomass in the slurry creating a sheared slurry, said device comprising a chamber containing a fixed stator equipped with a nozzle tool containing concentric rings having bore holes meshing, with opposing coaxial toothed rings coupled to a rotor that is coupled to a rotatable shaft.

2. The method of claim 1, wherein the slurry of step (b) was formed in a medium-shear, mixer-grinder-pump then passed to step (c).

3. The method of claim 1, further comprising;
   d) mixing the sheared slurry from step (c) with an enzyme to form a mixture; and
   e) subjecting said mixture to said high-shear forces created by said device to form a sheared mixture.

4. The method of claim 3, wherein the enzyme comprises cellulase, cellobiase, or a combination of cellulase and cellobiase.

5. The method of claim 3, wherein said mixture further comprises a surfactant.

6. The method of claim 5, wherein the surfactant is an oleate ester of sorbitol.

7. The method of claim 3, further comprising the following steps:
   f) separating said sheared mixture from step (e) to produce a filtrate and a retentate;
   g) adding the retentate to a newly formed sheared slurry from step (c) forming a mixture; and
   h) simultaneously adding an enzyme to said mixture and subjecting said mixture to said high-shear forces created by said device.

8. A method for treating lignocellulosic biomass to make it more susceptible to hydrolysis, comprising the steps of:
   a) mixing a ground lignocellulosic biomass with water to produce a slurry; and
   b) subjecting said slurry to high-shear forces by injecting said slurry cross-currently into a turbulent Couette flow created in a high-frequency, rotor-stator device under conditions to microcavitate said slurry to shatter the fibrous structure of the biomass in the slurry creating a sheared slurry, said device comprising a chamber containing a fixed stator equipped with a nozzle tool containing concentric rings having bore holes meshing with opposing coaxial toothed rings coupled to a rotor that is coupled to a rotatable shaft.

9. The method of claim 8, further comprising:
   c) mixing the sheared slurry from step (b) with an enzyme to form a mixture; and
   d) subjecting said mixture to said high-shear forces created by said device to form a sheared mixture.

10. The method of claim 9, wherein the enzyme comprises cellulase, cellobiase, or a combination of cellulase and cellobiase.

11. The method of claim 9, wherein said mixture further comprises a surfactant.

12. The method of claim 11, wherein said surfactant is an oleate ester of sorbitol.

13. The method of claim 9, further comprising the following steps:
   f) separating said sheared mixture from step (d) to produce a filtrate and a retentate;
   g) adding the retentate to a newly formed sheared slurry from step (b) forming a mixture; and
   h) simultaneously adding an enzyme to said mixture and subjecting said mixture to said high-shear forces created by said device.

14. A method of treating lignocellulosic biomass to make it more susceptible to hydrolysis, comprising the following steps:

a) providing a ground fibrous lignocellulosic biomass;

b) mixing said ground biomass with water in a medium-shear, mixer-grinder-pump to produce a slurry;

c) holding said slurry in residence at a temperature of about 90° C. for about 30 minutes;

d) titrating the pH of said slurry to pH of about 5;

e) subjecting said slurry to high-shear forces by injecting said slurry cross-currently into a turbulent Couette flow created in a high-frequency, rotor-stator device under conditions to microcavitate the slurry to shatter the fibrous structure of the biomass in the slurry creating a sheared slurry, said device comprising a chamber containing a fixed stator equipped with a nozzle tool containing concentric rings having bore holes meshing with opposing coaxial toothed rings coupled to a rotor that is coupled to a rotatable shaft;

cooling said sheared slurry to a temperature of about 50° C.;

g) mixing said sheared slurry with an enzyme, selected from the group cellulase, cellobiase, and a combination of cellulase and cellobiase, and a surfactant to form a first mixture;

h) subjecting said first mixture to said high-shear forces created by said device;

i) separating said first mixture producing a filtrate and a retentate;

j) adding the retentate to a newly formed sheared slurry from step (c) forming a second mixture; and k) simultaneously adding an enzyme, selected from the group cellulase, cellobiase, and a combination of cellulase and cellobiase, and a surfactant to said second mixture and subjecting said second mixture to said high-shear forces created by said device.

15. The method of claim 14, wherein the surfactant is an oleate ester of sorbitol.

16. A method of hydrolyzing lignocellulosic biomass, comprising the following steps:

a) mixing a ground lignocellulosic biomass, water, an enzyme capable of converting cellulose and hemicellulose to sugars, and a surfactant to form a slurry;

b) subjecting said slurry to high-shear forces by injecting said slurry cross-currently into a turbulent Couette flow created in a high-frequency, rotor-stator device under conditions to microcavitate said slurry to shatter the fibrous structure of the biomass in the slurry creating a sheared slurry, said device comprising a chamber containing a fixed stator equipped with a nozzle tool containing concentric rings having bore holes meshing with opposing coaxial toothed rings coupled to a rotor coupled to a rotatable shaft.

17. The method of claim 16, further comprising the following steps:

c) separating said sheared slurry from step (b) to produce a filtrate and a retentate;

d) adding the retentate to a newly formed sheared slurry from step (b) forming a mixture; and e) simultaneously adding an enzyme selected from the group cellulase, cellobiase and a combination of cellulase and cellobiase and a surfactant to said mixture and subjecting said mixture to said high-shear forces created by said device.

18. The method of claim 17, wherein the surfactant is an oleate ester of sorbitol.

19. A method of treating lignocellulosic biomass to make it more susceptible to hydrolysis, comprising the following steps:

a) providing a ground lignocellulosic biomass;

b) mixing said ground biomass with liquid ammonia to produce a slurry;

c) subjecting said slurry to high-shear forces by injecting said slurry cross-currently into a turbulent Couette flow created in a high-frequency, rotor-stator device under conditions to microcavitate said slurry to shatter the fibrous structure of the biomass in the slurry creating a sheared slurry, said device comprising a chamber containing a fixed stator equipped with a nozzle tool containing concentric rings having bore holes meshing with opposing coaxial toothed rings coupled to a rotor coupled to a rotatable shaft; and d) removing said liquid ammonia from said slurry to form a particulate substrate.

20. The method of claim 19, wherein the removal of liquid ammonia is accomplished by filter pressing, gasification, water absorption, heat drying, pressure reduction, or any combination thereof.

21. The method of claim 19, further comprising the following steps:

e) mixing said particulate substrate from step (d) with water and an enzyme and a surfactant to form a mixture;

f) subjecting said mixture to said high-shear forces created by said device to form a sheared mixture;

g) separating said sheared mixture to produce a filtrate and a retentate;

h) adding the retentate to a newly formed slurry from step (e); and i) simultaneously adding an enzyme and a surfactant to said slurry and subjecting said slurry to said high-shear forces created by said device.

22. The method of claim 21, wherein the enzyme comprises cellulase, cellobiase, or a combination of cellulase and cellobiase.

23. The method of claim 21, wherein the surfactant is an oleate ester of sorbitol.

24. The method of claim 1, further comprising the following steps:

holding said slurry formed in step B in residence at a temperature of about 90° C. for about 30 minutes; titrating the pH of said slurry to a pH of about 5 and passing said slurry to said C.

25. A method of treating a fibrous lignocellulosic biomass to make it more susceptible to hydrolysis, comprising the following steps.

a) providing a ground fibrous lignocellulosic biomass;

b) mixing said ground biomass with an alkali solution containing from 1% to 10% alkali by weight to produce a slurry;

c) holding said slurry in residence for a period of time sufficient to swell said biomass; and d) subjecting said slurry to high-shear forces by injecting said slurry cross-currently into a turbulent Couette flow created in a high-frequency, rotor-stator device under conditions to microcavitate the slurry to shatter the fibrous structure of the biomass in the slurry creating a sheared slurry, said device comprising a chamber containing a fixed stator equipped with a nozzle tool containing concentric rings having bore holes meshing with opposing coaxial toothed rings coupled to a rotor that is coupled to a rotatable shaft.

26. The method of claim 25, wherein the alkali comprises calcium hydroxide or sodium hydroxide.

27. The method of claim 25, wherein said slurry is held in residence for a period of time from 30 minutes to 3 hours at a temperature ranging from about 75° C. to 90° C.

28. A method of treating a fibrous lignocellulosic biomass to make it more susceptible to hydrolysis, comprising the following steps:

a) providing a ground fibrous lignocellulosic biomass;

b) mixing said ground biomass with from about 1% to 4% concentrated acid by weight to form a slurry;

c) maintaining the pH of said slurry in a range from a pH of about 1.8 to a pH of about 5.2;

d) holding said slurry in residence for a period of time sufficient to swell said biomass;

e) subjecting said slurry to high-shear forces by injecting said slurry cross-currently into a turbulent Couette flow created in a high-frequency, rotor-stator device under conditions to microcavitate the slurry to shatter the fibrous structure of the biomass in the slurry creating a sheared slurry, said device comprising a chamber containing a fixed stator equipped with a nozzle tool containing concentric rings having bore holes meshing with opposing coaxial toothed rings coupled to a rotor that is coupled to a rotatable shaft; and f) centrifuging said sheared slurry to separate said acid from said biomass.

29. The method of claim 28, wherein said fibrous lignocellulosic biomass contains 18% or more lignin, said concentrated acid is about 4% by weight, said slurry is maintained at a pH ranging from about 1.8 to about 4.2, and said slurry is held in residence for a period of time ranging from about 30 minutes to about 3 hours at a temperature ranging from about 75° C. to about 120° C.

30. The method of claim 28, wherein said fibrous lignocellulosic biomass is a hay, said concentrated acid is about 2% by weight, said slurry is maintained at a pH ranging from about 2.8 to about 5.2, and said slurry is held in residence for a period of time ranging from about 30 minutes to about 3 hours at a temperature ranging from about 75° C. to about 90° C.

* * * * *